No. 678,645. Patented July 16, 1901.
C. I. DANGLER.
COMBINED HEATING AND IGNITING ATTACHMENT.
(Application filed Jan. 4, 1901.)
(No Model.) 2 Sheets—Sheet 1.
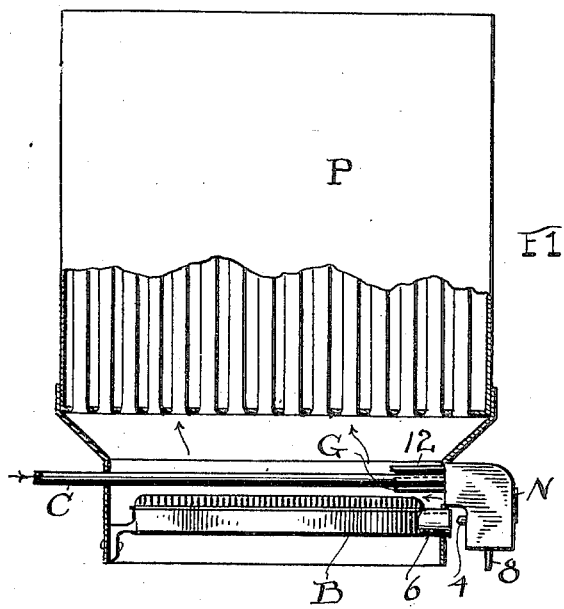
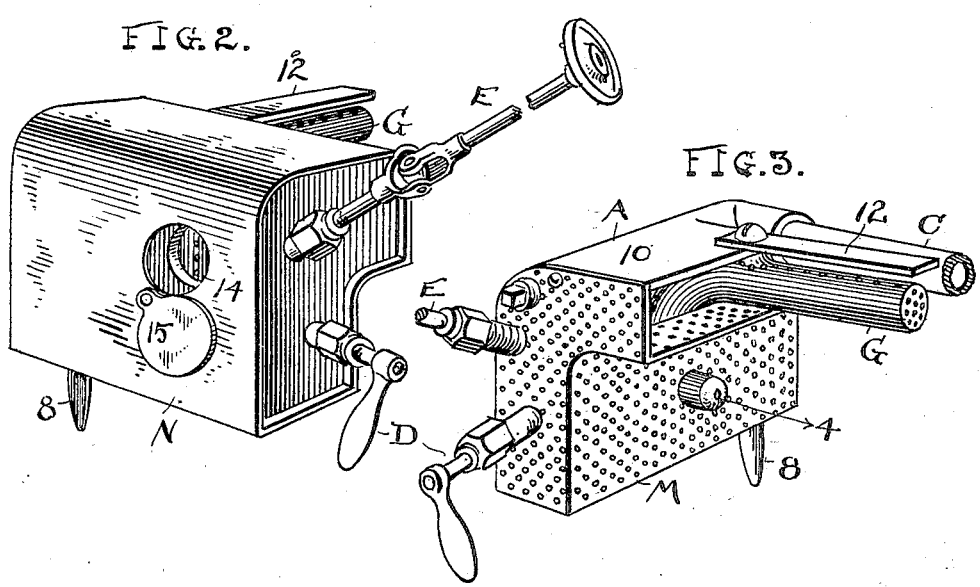
ATTEST
R. B. Moser
M. A. Shirhan
INVENTOR.
By Charles I. Dangler
W. T. Fisher
ATTY No. 678,645. Patented July 16, 1901.
C. I. DANGLER.
COMBINED HEATING AND IGNITING ATTACHMENT.
(Application filed Jan. 4, 1901.)
(No Model.) 2 Sheets—Sheet 2.

ATTEST.
T. B. Moser
M. A. Sheehan

INVENTOR.
Charles I. Dangler
By H. T. Fisher
ATTY

UNITED STATES PATENT OFFICE.

CHARLES I. DANGLER, OF CLEVELAND, OHIO.

COMBINED HEATING AND IGNITING ATTACHMENT.

SPECIFICATION forming part of Letters Patent No. 678,645, dated July 16, 1901.

Application filed January 4, 1901. Serial No. 42,097. (No model.)

*To all whom it may concern:*

Be it known that I, CHARLES I. DANGLER, a citizen of the United States, residing at Cleveland, in the county of Cuyahoga and State of Ohio, have invented certain new and useful Improvements in a Combined Heating and Igniting Attachment; and I do declare that the following is a full, clear, and exact description of the invention, which will enable others skilled in the art to which it appertains to make and use the same.

My invention relates to a new and improved combined heating or igniting attachment adapted especially to be used on what are now commonly known as "locomobile" or "automobile" vehicles, and the invention is especially designed for use with vehicles of this class or kind in which steam is employed as the motive agency or power, but it is not necessarily limited to this use, as will be seen farther on.

Figure 4:
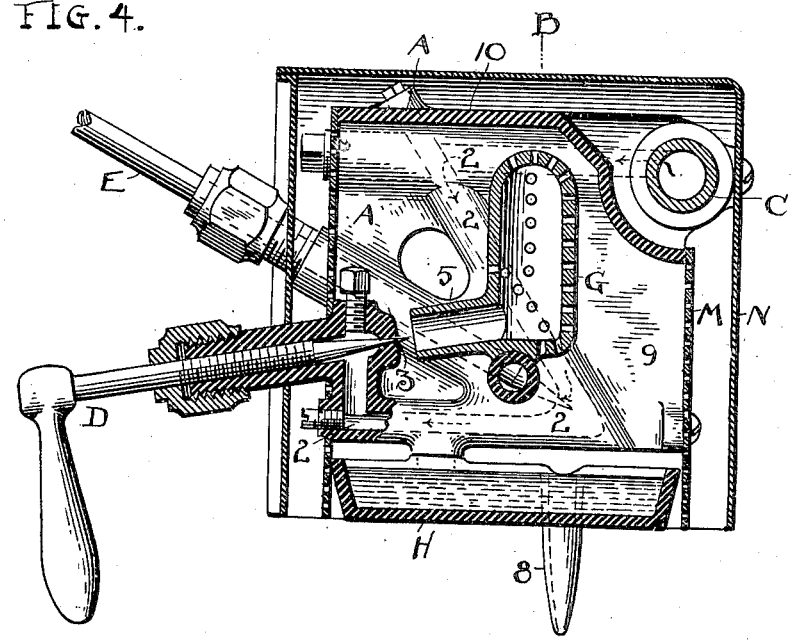
Figure 5:
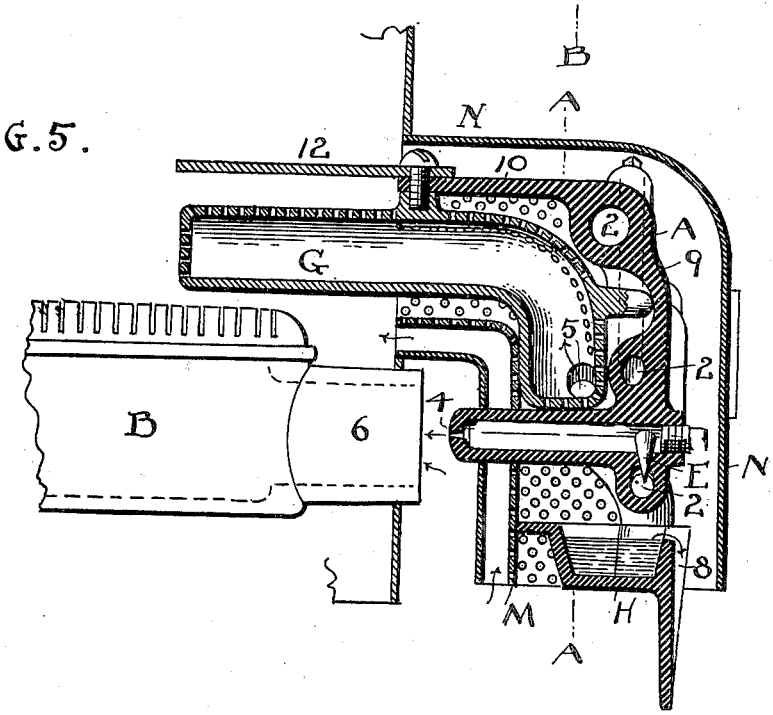

In the accompanying drawings, forming a part of this specification, Figure 1 is a plain elevation of the said attachment, the burner proper and the boiler together in working relation, the boiler being partly in section and the whole view being much reduced in size. Fig. 2 is a perspective of the said attachment, including its outer inclosing casing or cover and considerably enlarged over Fig. 1. Fig. 3 is a perspective of the attachment from directly the opposite point of view shown in Fig. 2, but with the outer casing removed and revealing an inner perforated shell, which conceals the inner parts of the attachment. Fig. 4 is a vertical sectional elevation of the attachment on line A A, Fig. 5; and Fig. 5 is a vertical sectional elevation thereof on line B B, Fig. 4, and at right angles to Fig. 4 across the center thereof.

As already stated, the invention shown herein is a combined heating and igniting attachment or heater and lighter designed to be used with self-impelled vehicles or vehicles which carry their own propelling power, and while it has working relation and patentable combination with other parts than those contained in itself the invention yet is chiefly comprised in parts shown in Figs. 2 to 5, inclusive, and comprised in the attachment. As such the attachment is further and chiefly an intermediary device not really having to do with heating the boiler or producing steam nor yet serving as the initial lighter, but designed and operating principally to maintain the conditions which have been prepared for making the main burner as such available and for lighting said burner at any time. When the boiler-burner is turned off, this intermediate or secondary heater and igniter keeps the device in generating condition and this may be for a long or a short time. Thus, supposing it be desirable to take a trip about a city and to make frequent stops of greater or less duration, the said intermediate heater will keep the generator in prepared condition indefinitely if allowed to run, and so it occurs that the boiler-burner is always ready to be turned on also and to work, however often or long it may have stopped.

Now, referring again to the drawings, there is a part marked A, which may be styled the "base" of the attachment, because it comprises the larger part thereof and is here shown as cast in one piece. This part, however, has features which for convenience of description will receive their own designations by name and character.

It is of course obvious that a liquid fuel is used, and the said fuel or oil is conveyed to the base A across the top of the boiler-heating burner B by pipe C, Fig. 1, thus converting the oil into vapor more or less completely before it reaches the generator proper after the parts have been brought to a generating condition. From the entrance of said pipe to the base the oil or the vapor thereof passes by what is here shown as a substantially Z-shaped duct 2 in or on the rear wall of base A and constituting the generator of the attachment. Two valves D and E control the outlets from the said generator, valve D serving for outlet or orifice 3 and valve E for orifice 4. Orifice 3, Fig. 4, discharges through a short mixer-tube 5 into the base of elbow-burner G, while orifice 4 discharges into mixer 6, connected with boiler-burner B. The part G is elbow-shaped, as here shown, and is a separate part or casting firmly secured to base A. It is also of tubular construction in this instance, but closed by a diaphragm at both ends and perforated at said ends and in a row lengthwise from end to end over its back. It may be further or differently perforated and yet serve my purpose for both heating and igniting; but this arrangement best serves the present construction. The shape of this member may also be changed and still remain its equivalent for all practical purposes. In any case it is the one element relied upon for keeping the attachment in good generating condition when for any reason the main burner is turned off, as well as for always igniting said burner. The attached heater and igniter may be closed when the boiler-burner is running, but usually I keep it open and lighted until a run of the machine is finished, and this may be for an hour or for a day. A further element of the attachment is mechanism for initially heating and lighting the igniter heater and lighter G. For this purpose I employ a suitable pan H, secured to the bottom edge of base A in this instance and having an overflow-channel 8. Oil is supplied to this pan by opening valve D, and as soon as the pan is filled to overflowing-channel 8 the valve is closed and ignition of the oil is easily effected by a match applied to the bottom of said channel. A peculiarity of this channel may here be noticed. At first I used a plain tube the full length, but then there was a tendency for a flame to burn at the bottom of the tube so long as to be alarming to the uninitiated, and hence to overcome this obvious objection I devised the present construction of an open channel or passage, substantially as shown. Now I can light by the overflow, and the flame will instantly run to the top and disappear within the pan and its inclosures.

The rear or generating wall 9 and the top or hood 10 are integral with and constitute the larger part of base A and are close or closed, so as to confine the heat about the generating-ducts on the inside thereof and themselves assist in heating said ducts, so that it requires a comparatively short time to bring the whole device to a generating condition. This always occurs by the time trough H is burned out, and then both valves D and E are opened and burner B will be started to heat the boiler.

It will be noticed that the igniter or pilot end of burner G projects a considerable distance beyond hood 10 over burner B and that it has a strip 12 projecting over it, which is adapted to promote lighting along the orifices in its top, and thus also facilitates igniting the boiler-burner by igniting the vapor escaping therefrom. The boiler-burner is therefore automatically lighted when a generating condition of the attachment has been reached and valve E is opened. In a vehicle this valve has a handle-stem coming up to a convenient place beneath the seat, where the driver can easily manipulate it for turning the burner on or off or for regulating the flame. My new attachment as thus shown has what are practically two jackets or inclosures M and N, one within and apart from the other and with an air-space between them at least part way around and over the top. The inner jacket or casing M is perforated and incloses the sides and front of base A and is affixed thereto. This makes an inner chamber which is not only protected from air drafts but is so inclosed that the flame from burner G is converted into practically a blue flame with clean combustion, air being supplied in just the right measure largely through the perforated jacket M. The outer casing N is an inclosing and protecting shield for everything within and as such is an essential part of the attachment and goes with it into the trade and into use. It completely envelops the other parts all around top and front about burner G and both casings are open here to allow the heat from within to pass out under the boiler. This attachment comes fairly near to the bottom of the wagon-body, and the outer casing A particularly serves to protect the body from injury by heat. A lighting-hole 14 serves to light the device when for any reason such lighting fails through cup H. A swinging disk 15 covers said opening.

Boiler P is shown in Fig. 1 more especially to bring out the relation of parts with which my attachment becomes associated in motor-vehicles of the steam-driven kind; but it might have a different association with other vehicles or in other places without affecting the invention.

I have been somewhat specific in the description of the parts of the invention; but I desire to be understood that I do not therefore regard the invention as limited to the specific form of parts shown and described, but rather that the invention has such breadth as to include any and all equivalents of each and all the parts named.

When my attachment is applied to a wagon, as already stated, the attachment is necessarily so incased as to prevent the possibility of fire on the outside and injury to the vehicle, because it comes very close to the body of the vehicle, and hence all flames in the attachment travel upward and out beneath the boiler around about burner G. When the attachment is placed upon a vehicle, the relation thereof to the direction of travel is such that the mixing-tube 5 at the base of burner G extends toward the front. Then as the vehicle travels the tendency is to cause a draft into said mixer and to facilitate the operation of the burner. Otherwise there would be danger of a tendency to a vacuum being produced at about the mouth of said mixer and the efficiency of the burner would be diminished.

What I claim is—

1. In a combined heating and igniting attachment adapted to be fixed at the side of a main-burner casing, the combination of a base provided with a vaporizing-channel, a heating and igniting burner comprising a portion arranged next to said base to heat the vaporizing-channel therein and another portion arranged to ignite the main burner, means for supplying vapor from said base to both the said burners, and means over the said heating and igniting burner to direct away the products of combustion arising therefrom, substantially as described.

2. As a new article of manufacture and sale, a combined heating and igniting attachment adapted to be supported at the side of a main-burner casing, comprising a generator-base having a vaporizing-channel, an initial heater and lighter at the bottom of said base and a perforated heating and lighting burner arranged to sustain a heating-flame next to the said channel and to ignite the main burner, a valve to supply fluid to said initial heater and lighter and vapor to said heating and igniting burner, and means outside of the main burner and its casing and over said heating and igniting burner to conduct away the products of combustion from the said heating and igniting burner, substantially as described.

3. In automobiles, a combined heating and igniting attachment adapted to be independently supported at one side of a main burner, said attachment comprising a generator-base with a vaporizing-duct and valved outlets, a hollow burner removably secured to said base and having a perforated portion next thereto to heat the same and a substantially horizontal perforated portion to ignite the main burner, a valved opening from said base into the said hollow burner, and a conduit for the products of combustion from over said attachment, substantially as described.

4. An attachment adapted to be removably secured to the side of a main burner-casing, comprising a generator-base having a vaporizing-channel and valved outlets, in combination with a hollow perforated substantially elbow-shaped burner having a vertical portion next to the wall of the said base and a substantially horizontal portion projecting outward to ignite the main burner, and means for directing the products of combustion laterally from over said elbow-shaped burner, substantially as described.

5. In hydrocarbon-burners, a combined heating and igniting attachment comprising a generator-base with a vaporizing-channel, a hollow burner having a perforated portion arranged in heating relation to said base and perforated extremity arranged to ignite the main burner, in combination with a main burner having a vapor-inlet, a valved outlet from the bottom of said base to said main-burner inlet, and means to direct the products of combustion from the hollow burner into the space over the main burner, said attachment being located at the side of the main burner, substantially as described.

6. The main burner and the casing therefor and a fuel-supply pipe across said burner, in combination with an attachment at the side of said main burner comprising a vapor-generator base and a combined heating and igniting burner having one portion arranged for igniting the main burner and in proximity to said fuel-supply pipe and the other portion arranged for heating said base, and a casing about said attachment in open relation at its top to the said main-burner casing, whereby the products of combustion in said attachment are discharged into the said main-burner casing, said heating and igniting burner being perforated for the escape of vapor and a valved opening from said base to said burner, substantially as described.

7. A stationary main burner and a boiler and casing about said parts, in combination with a combined heating and igniting attachment removably fixed at the outside of said main burner and comprising a generator-base, a perforated heating and igniting burner secured to said base and having one end projecting into igniting relation with said burner and the other end in heating relation to the said base, an initial heater and lighter, and a walled inclosure about said generator-base and burner and said initial heater and lighter and open at its top and side into the main-burner casing, substantially as described.

8. In a combined heating and igniting attachment adapted to be fixed at the side of a main-burner casing, the combination of a base provided with a vaporizing-channel, a heating and igniting burner comprising a portion arranged next to said base to heat the vaporizing-channel, and another portion arranged to ignite the main burner, means for supplying vapor from said base to both the burners, a casing for the base and the igniting burner and an initial heater and lighter beneath said base provided with an overflow-channel, said channel extending downward below said casing, substantially as described.

Witness my hand to the foregoing specification this 19th day of December, 1900.

CHARLES I. DANGLER.

Witnesses:
M. A. SHEEHAN,
R. B. MOSER.